(12) United States Patent
Zhang

(10) Patent No.: US 12,119,189 B2
(45) Date of Patent: Oct. 15, 2024

(54) CONTROLLABLE SWITCH, DUAL-CONTROL SWITCH AND CONTROL SYSTEM

(71) Applicant: BEIJING XIAOMI MOBILE SOFTWARE CO., LTD., Beijing (CN)

(72) Inventor: He Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 701 days.

(21) Appl. No.: 17/334,621

(22) Filed: May 28, 2021

(65) Prior Publication Data

US 2022/0148833 A1    May 12, 2022

(30) Foreign Application Priority Data

Nov. 6, 2020 (CN) .......................... 202011232873.7

(51) Int. Cl.
| | |
|---|---|
| *H01H 47/00* | (2006.01) |
| *G05B 15/02* | (2006.01) |
| *G08C 17/02* | (2006.01) |
| *H02J 3/00* | (2006.01) |

(52) U.S. Cl.
CPC ............. *H01H 47/00* (2013.01); *G05B 15/02* (2013.01); *G08C 17/02* (2013.01); *G08C 2201/10* (2013.01); *H02J 3/00* (2013.01)

(58) Field of Classification Search
CPC ...... H01H 47/00; G05B 15/02; G05B 19/418; G05B 2219/2642; G08C 17/02; G08C 2201/10; H02J 3/00; H05B 47/175
See application file for complete search history.

(56) References Cited

U.S. PATENT DOCUMENTS

| | | | | |
|---|---|---|---|---|
| 2013/0201316 | A1* | 8/2013 | Binder | .................... H04L 67/12 |
| | | | | 701/2 |
| 2017/0086281 | A1* | 3/2017 | Avrahamy | ........... H05B 47/115 |
| 2017/0155526 | A1 | 6/2017 | Li | |

FOREIGN PATENT DOCUMENTS

| | | |
|---|---|---|
| CN | 203746689 U | 7/2014 |
| CN | 204360140 U | 5/2015 |
| CN | 105739398 A | 7/2016 |
| CN | 107018610 A | 8/2017 |
| CN | 206920850 U | 1/2018 |
| CN | 109254534 A | 1/2019 |

(Continued)

OTHER PUBLICATIONS

European Patent Application No. 21176698.5 extended Search and Opinion dated Dec. 1, 2021, 14 pages.

(Continued)

*Primary Examiner* — Charles R Kasenge
(74) *Attorney, Agent, or Firm* — Cozen O'Connor

(57) ABSTRACT

A controllable switch, a dual-control switch, and a control system including a controllable switch includes a wireless communication module and a switch component. The wireless communication module is coupled to the switch component. The wireless communication module is configured to send a control instruction to the switch component in response to receiving a switching request. The switch component is configured to switch from a first state to a second state after receiving the control instruction. The first state is one of a turning-on state and a turning-off state, and the second state is the other one of the turning-on state and the turning-off state.

18 Claims, 3 Drawing Sheets

(56) References Cited

FOREIGN PATENT DOCUMENTS

| CN | 110402002 A | 11/2019 |
|---|---|---|
| CN | 110753434 A | 2/2020 |
| CN | 111665794 A | 9/2020 |
| WO | WO 2017004681 A1 | 1/2017 |

OTHER PUBLICATIONS

European Patent Application No. 21176698.5, Office Action dated Feb. 2, 2024, 13 pages.

\* cited by examiner

CONTROLLABLE SWITCH, DUAL-CONTROL SWITCH AND CONTROL SYSTEM

CROSS REFERENCE TO RELATED APPLICATION

This application is based on and claims priority to Chinese patent application No. 202011232873.7, filed on Nov. 6, 2020, the entire content of which is hereby incorporated into this application by reference.

TECHNICAL FIELD

The present disclosure relates to the technical field of control technologies, and in particular to, a controllable switch, a dual-control switch and a control system.

BACKGROUND

As smart homes become more and more popular, traditional mechanical switches have been unable to satisfy functions of smart control homes for people. In related arts, dual-control switches may be used for some electric loads, thus users may operate and control the same electric load to power-on or power off in multiple locations, however the users still require to go to a corresponding position to perform touch operations.

SUMMARY

The present disclosure provides a controllable switch, a dual-control switch and a control system.

In a first aspect, embodiments of the disclosure provide a controllable switch. The controllable switch includes a wireless communication module and a switch component. The wireless communication module is coupled to the switch component. The wireless communication module is configured to send a control instruction to the switch component in response to receiving a switching request. The switch component is configured to switch from a first state to a second state after receiving the control instruction. The first state is a turning-on state and the second state is a turning-off state, or the first state is the turning-off state and the second state is the turning-on state.

In a second aspect, embodiments of the present disclosure provide a dual-control switch. The dual-control switch includes: two controllable switches. A first terminal of a first controllable switch is coupled to a first power wire of a power grid. A first terminal of a second controllable switch is coupled to a first terminal of an electric load to be controlled. A second terminal of the first controllable switch is coupled to a second terminal of the second controllable switch. A third terminal of the first controllable switch is coupled to a third terminal of the second controllable switch. In response to receiving a control instruction, the first controllable switch or the second controllable switch is configured to switch from a first state to a second state such that the first terminal of the first controllable switch is connected to or disconnected from the first terminal of the second controllable switch. The control instruction includes at least one of a control instruction received by a wireless communication module of the first controllable switch, a control instruction received by a wireless communication module of the second controllable switch, a button of the first controllable switch being triggered to operate, and a button of the second controllable switch being triggered to operate.

In a third aspect, embodiments of the present disclosure provide a control system. The control system includes: the dual-control switch and an electric load. The first terminal of the first controllable switch in the dual-control switch is coupled to the first power wire of the power grid; the first terminal of the second controllable switch in the dual-control switch is coupled to a first terminal of the electric load to be controlled; a second terminal of the electric load to be controlled is coupled to a second power wire of the power grid. In response to receiving a control instruction, the first controllable switch or the second controllable switch is configured to switch from the first state to the second state for connecting the electric load to the power grid or disconnecting the electric load from the power grid. The control instruction includes at least one of a control instruction received by the first controllable switch, a control instruction received by the second controllable switch, a button of the first controllable switch being triggered to operate, and a button of the second controllable switch being triggered to operate.

It should be understood that the above general description and the following detailed description are only exemplary and explanatory, and do not limit the present disclosure.

BRIEF DESCRIPTION OF THE DRAWINGS

The drawings herein are incorporated into the specification and constitute a portion of the specification and illustrate embodiments in accordance with the disclosure, and the drawings together with the specification are used to explain the principle of the disclosure.

DETAILED DESCRIPTION

Figure 1:
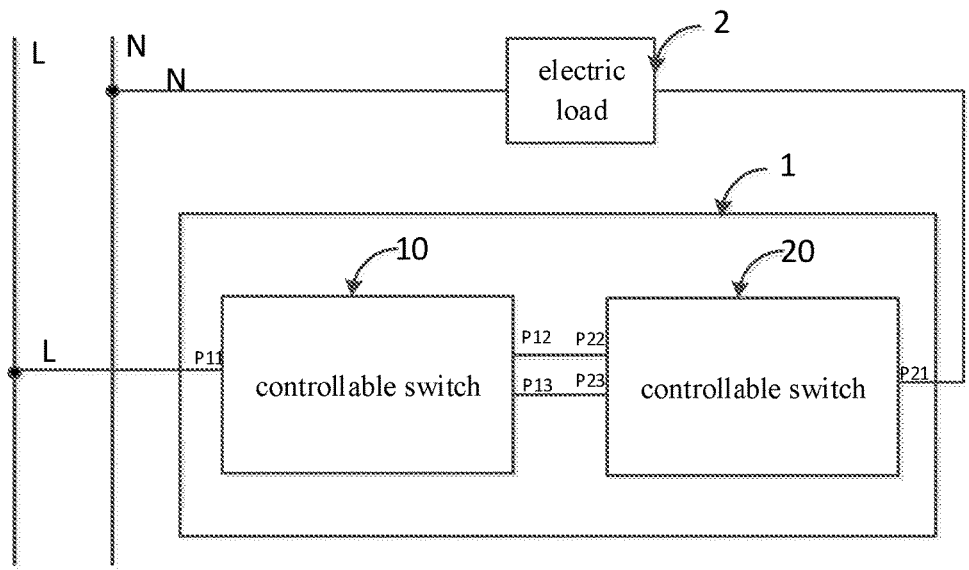
FIG. 1 is a block diagram illustrating a control system according to an embodiment of the present disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses consistent with aspects related to the present disclosure as recited in the appended claims.

In order to solve the above technical problems, embodiments of the present disclosure provide a controllable switch, a dual-control switch and a control system, the idea of which is:

First, by providing a wireless communication module in the controllable switch, non-touch wireless control may be realized on the basis of ensuring touch button control, which is beneficial to expand a control range and enhance usage experiences.

Second, two controllable switches may form the dual-control switch. In response to press of a button of any controllable switch, remote touch button control may be realized. Moreover, the non-touch wireless control may be realized through the wireless communication module of any controllable switch, which may further expand the control range.

Third, when the dual-control switch is applied for the control system, electric loads in the control system may be controlled by remote, buttons, wireless and other control methods.

Further, when the control system includes a network device, such as a router, a gateway, etc., the control system may log in to a cloud server through an electronic device, and the cloud server controls the dual-control switch through the network device to achieve an effect of cloud control.

It should be noted that, considering that the controllable switch is a unit for forming the dual-control switch, and the dual-control switch is a unit for forming the control system, the following will take the control system as a description object, with interspersed descriptions of the dual-control switch and the controllable switch. For the convenience of description, the two controllable switches in the dual-control switch are implemented with the same structure.

It should also be noted that the controllable switch or the dual-control switch or the control system may include a battery, which may supply power to the wireless communication module in the controllable switch, such that the wireless communication module may maintain a state of being able to communicate or establish a communication link at any time. That is, the wireless communication module may be supplied power by the battery, and/or, the controllable switch may directly take power from a power grid that supplies power to the electric load. Thus, external power supply is realized. Those skilled may select a suitable power supply according to specific scenarios. For convenience of description, the following embodiments will be described by using the external power supply as an example, but which will not constitute a limitation to the embodiments of the present disclosure.

FIG. 1 is a block diagram illustrating a control system according to an embodiment of the present disclosure. Reference to FIG. 1, the control system includes a dual-control switch 1 and an electric load. The dual-control switch 1 includes two controllable switches, namely, a first controllable switch 10 and a second controllable switch 20.

A first terminal P11 of the first controllable switch 10 in the dual-control switch 1 is coupled to a first power wire L (such as a fire wire) of the power grid. A second terminal P12 of the first controllable switch 10 is coupled to a second terminal P22 of the second controllable switch 20. A third terminal P13 of the first controllable switch 10 is coupled to a third terminal P23 of the second controllable switch 20. A first terminal P21 of the second controllable switch 20 in the dual-control switch 1 is coupled to a first terminal of the electric load 2 to be controlled. A second terminal of the electric load 2 to be controlled is coupled to a second power wire N (such as a zero wire) of the power grid.

In response to receiving a control instruction, the first controllable switch 10 or the second controllable switch 20 is configured to switch from the first state to the second state for connecting the electric load 2 to the power grid or disconnecting the electric load 2 from the power grid. An effect of power supply or power off for the electric load 2 is achieved.

In this embodiment, the control instruction may include at least one a control instruction received by the first controllable switch, a control instruction received by the second controllable switch, a button of the first controllable switch being triggered to operate, or a button of the second controllable switch being triggered to operate.

Figure 2:
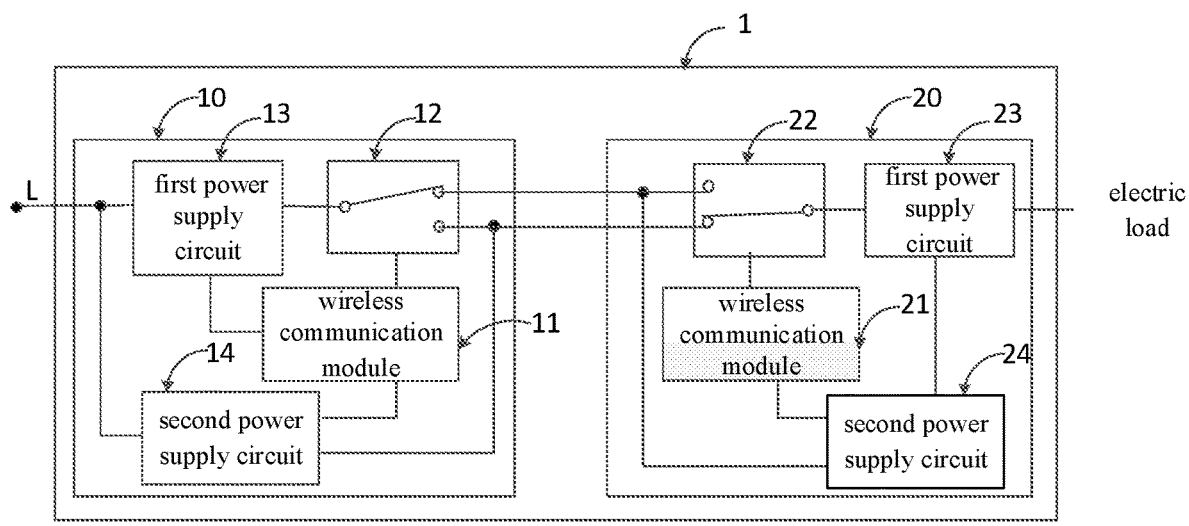
FIG. 2 is a block diagram illustrating a dual-control switch according to an embodiment of the present disclosure.

In this embodiment, the dual-control switch 1 includes the first controllable switch 10 and the second controllable switch 20, and the first controllable switch 10 and the second controllable switch 20 are implemented with the same structure. Taking the first controllable switch 10 as an example and referring to FIG. 2, the first controllable switch 10 includes a wireless communication module 11 and a switch component 12. The wireless communication module 11 is coupled to the switch component 12. The wireless communication module 11 is configured to send a control instruction to the switch component 12 in response to receiving a switching request. The switch component 12 is configured to switch from the first state to the second state after receiving the control instruction. The first state is one of a turning-on state and a turning-off state, and the second state is the other one of the turning-on state and the turning-off stat. That is, the first state may be the turning-on state and the second state may be the turning-off state, or the first state may be the turning-off state and the second state may be the turning-on state.

The switching request may include the dual-control switch corresponding to the electric load to be controlled, a target state to be switched to, etc., which may be set according to specific scenarios and will not be limited here.

The wireless communication module 11 may include at least one of a Wi-Fi module, a ZigBee module and a Bluetooth module. Those skilled may select a suitable wireless communication manner according to the specific scenarios, and in a case of being capable of achieving the wireless communication, the corresponding solution will fall within the protection scope of the present disclosure.

The switch component 12 may be implemented by a single-pole double-throw switch and its controller or implemented by a relay. Those skilled may select a suitable switch component according to the specific scenarios. In a case of being capable of switching between at least two states, the corresponding solution will fall within the protection scope of the present disclosure.

In an embodiment, when the power supply is the external power supply, the first controllable switch 10 further includes a first power supply circuit 13. The first power supply circuit 13 may be implemented by an AC-DC circuit, or implemented by a current transformer or a voltage transformer. Those skilled may select a suitable manner for taking power according to specific scenarios, and in a case of being capable of obtaining voltage or current from the power grid, the corresponding solution will fall within the protection scope of the present disclosure. In this embodiment, the first power supply circuit 13 may supply power for the wireless communication module by a manner of obtaining current, and the current for power supply is at a level of milliampere.

In an embodiment, the first power supply circuit 13 includes a first terminal, a second terminal, and a third terminal, and the switch component 12 includes a first switch-component terminal and a second switch-component terminal. When the first switch-component terminal and the second switch-component terminal of the switch component 12 are connected, the switch component 12 is in the turning-on state. Continuing to refer to FIG. 2, a connection relationship between the first power supply circuit 13 and the switch component 12 is: the first terminal of the first power supply circuit 13 is coupled to a first terminal of the dual-control switch 1, that is, to the first power wire L of the power grid. The second terminal of the first power supply circuit 13 is coupled to the first switch-component terminal of the switch component 12, and the third component of the first power supply circuit 13 is coupled to the wireless communication module 11.

The above-mentioned first power supply circuit 13 may operate as follows: when the switch component 22 of the second controllable switch 20 is in the turning-off state, a path may be formed between the switch component 12 and the switch component 22. At this time, the first power supply circuit 13 may supply power for the wireless communication module 11. When the switch component 22 of the second controllable switch 20 is in the turning-on state, no path may be formed between the switch component 12 and the switch component 22. At this time, the first power supply circuit 13 cannot supply power for the wireless communication module 11, and a local battery may supply power for the wireless communication module during this period. It is understood that an operating time of some electric loads, such as refrigerators, may be much longer than a stop operating time those same electric loads. Therefore, the first power supply circuit 13 is provided to ensure that the wireless communication module is in an on-off state, which is beneficial to prolong a service time of the battery.

In an embodiment, when the power supply is the external power supply, the first controllable switch 10 further includes a second power supply circuit 14. The second power supply circuit 14 may be implemented by an AC-DC circuit, or implemented by a current transformer or a voltage transformer. Those skilled may select a suitable manner for taking power according to specific scenarios, and in a case of being capable of obtaining voltage or current from the power grid, the corresponding solution will fall within the protection scope of the present disclosure. In this embodiment, the second power supply circuit 14 may supply power for the wireless communication module by a manner of obtaining voltage, and the voltage for power supply is between 3.3V and 5V.

In an embodiment, the second power supply circuit 14 includes a first terminal, a second terminal and a third terminal, and the switch component 12 includes a first switch-component terminal and a switch-component third terminal. When the first switch-component terminal and the third switch-component terminal of the switch component 12 are connected, the switch component 12 is in the turning-off state. Continuing to refer to FIG. 2, a connection relationship between the second power supply circuit 14 and the switch component 12 is: the first terminal of the second power supply circuit 14 is coupled to the first terminal of the dual-control, that is, to the first power wire L of the power grid. The second terminal of the second power supply circuit 14 is coupled to the third switch-component terminal of the switch component 12, and the third terminal of the second power supply circuit 14 is coupled to the wireless communication module 11.

The above-mentioned second power supply circuit 14 may operate as follows: in a condition that the switch component 12 is in the turning-off state, when the switch component 22 of the second controllable switch 20 is in the turning-off state, the second power supply circuit 14 may obtain a voltage between two terminals of the switch component 12 (that is, a voltage difference between L and N) and convert the voltage to supply power to the wireless communication module 11. When the switch component 22 of the second controllable switch 20 is in the turning-on state, the voltage between two terminals of the switch component 12 drops to 0V, that is, the second power supply circuit 14 cannot obtain the voltage and cannot supply power to the wireless communication module 11, and the local battery may supply power for the wireless communication module during this period. It is understood that a stop operating time of some electric loads, such as electric kettles, may be much longer than an operating time of those same electric loads. Therefore, the second power supply circuit 14 is provided to ensure that the wireless communication module is in an operating state, which is beneficial to prolong a service time of the battery.

It should be noted that the first controllable switch 10 may be provided with the first power supply circuit 13 and the second power supply circuit 14 at the same time. At this time, the first controllable switch 10 may be applied for the electric loads with different operating times, so that it is not required to provide the battery to avoid a problem of replacing the battery.

In an embodiment, in the dual-control switch 1, the wireless communication modules in the controllable switch 10 and the controllable switch 20 may respectively communicate with an electronic device. On this basis, when the wireless communication module in the controllable switch 10 or the controllable switch 20 establishes a communication link with the electronic device, the electronic device may communicate with the wireless communication module and send the switching request to the wireless communication module. In practical applications, the wireless communication modules in the controllable switch 10 and the controllable switch 20 may establish the communication link with the electronic device at the same time. At this time, the electronic device determines the wireless communication module with a higher link signal strength as a main module, and sends the switch request to the main module. In this way, in this embodiment, the dual-control switch 1 may be used to realize remote control for the electric load and expand the control range.

In one embodiment, in the dual-control switch 1, the wireless communication modules in the controllable switch 10 and the controllable switch 20 will maintain a paired connection for determining the on-off state of the electric load. The on-off state includes a power-on state or a power-off state. For example, when the states of the switch component 12 and the switch component 22 are the same, it may be determined that the on-off state of the electric load is the power-off state; when the states of the switch component 12 and the switch component 22 are different, it may be determined that the on-off state of the electric load is the power-on state. In this way, in the dual-control switch 1 any one of the switch component 12 and the switch component 22 may be adjusted to realize an adjustment of power-on or power-off.

In an embodiment, the switch component 12 further includes a button. The button is configured to switch the controllable switch from the first state to the second state or from the second state to the first state after being triggered for operating, so that the power-on or power-off of the electric load may be adjusted according to requirements of users.

Figure 3:
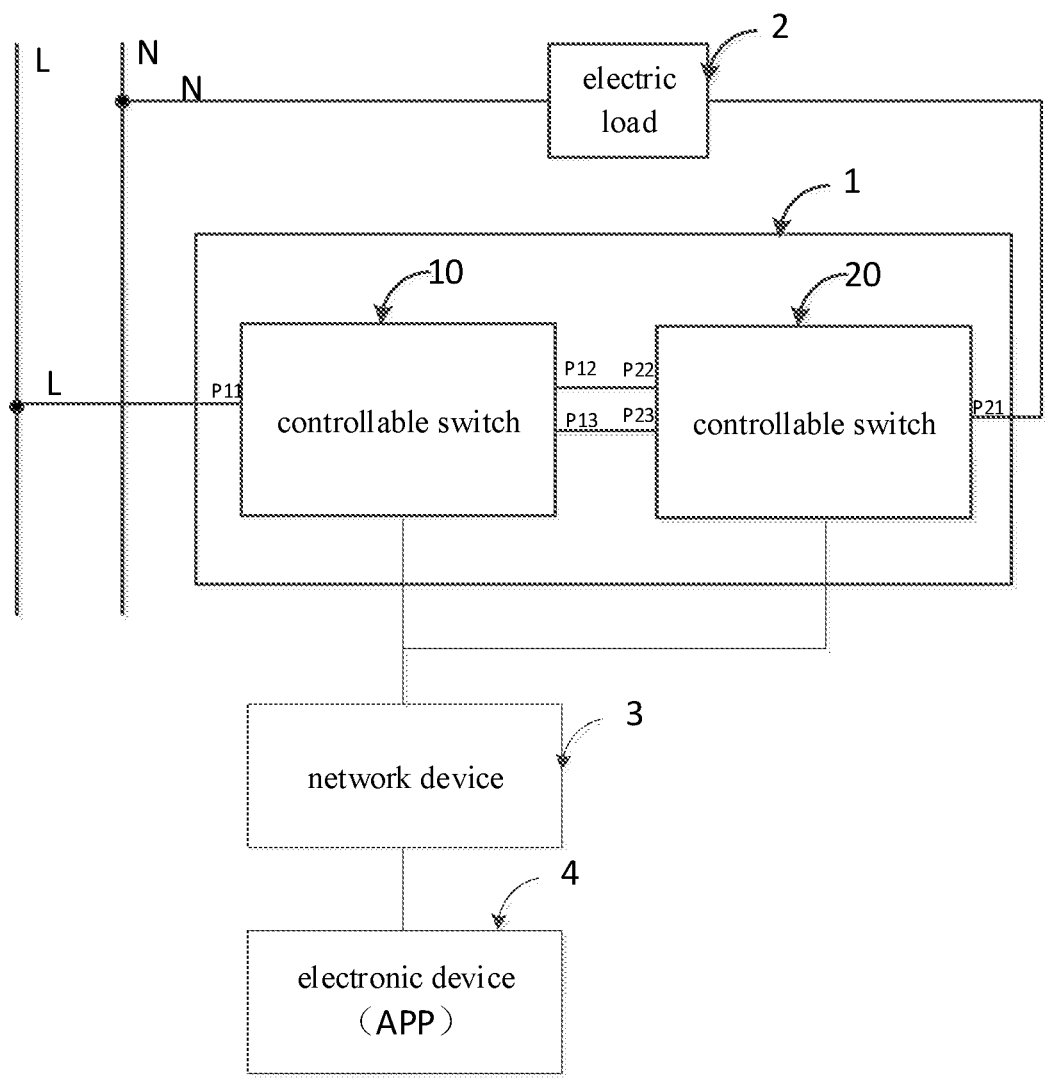
FIG. 3 is a block diagram illustrating a control system according to another embodiment of the present disclosure.

In an embodiment, referring to FIG. 3, the control system further includes a network device 3. The network device 3 may maintain paired with at least one of the first controllable switch and the second controllable switch. And the network device 3 may maintain paired with the electronic device 4. In this way, when the electronic device 4 is within the communication range of the network device 3, the two may establish a communication link. At this time, the electronic device 4 may send the switching request to the network device 3, and the network device 3 may send the received switching request to the controllable switch that is paired with the network device 3. The controllable switch may realize switching power-on or power-off of the electric load 2 in response to the above-mentioned switching request. In this way, in this embodiment, it is convenient for the users to control the electric load at any location within the communication range. The communication range may be a local zone such as a home or an office. For example, the users may turn off a TV and a light in a living room with their mobile phones in the bedroom.

Figure 4:
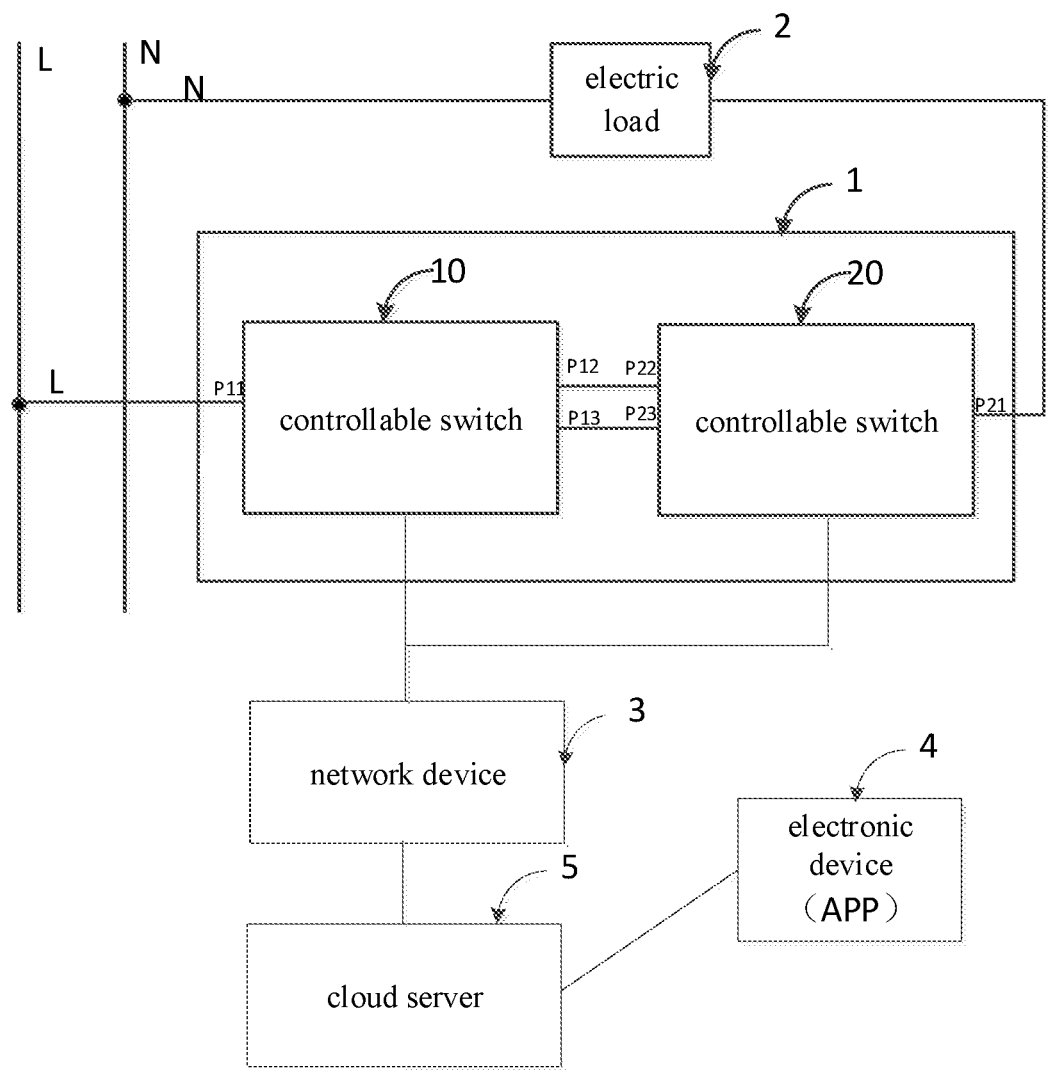
FIG. 4 is a block diagram illustrating a control system according to still another embodiment of the present disclosure.

In an embodiment, referring to FIG. 4, the control system further includes a cloud server 5. The cloud server 5 may communicate with the network device 3, and further, communicate with the controllable switch (10 and/or 20) logged in to the cloud server 5. After the user logs in to an application APP through the electronic device, the electric load to be controlled may be selected, and then the electronic device generates the switching request for the electric load and uploads the switching request to the cloud server 5. The cloud server 5 may query the dual-control switch, and send the switching request to any wireless communication module in the dual-control switch. The controllable switch may realize switching power-on or power-off of the electric load 2 in response to the above-mentioned switching request. In this way, in this embodiment, the electric load may be controlled remotely. For example, the dual-control switch may be controlled by the APP in the office to turn off (forgetting to turn off) electrical equipment, and the dual-control switch may also be controlled by the APP in the office to turn on an air conditioner in advance, which is convenient to enjoy a comfortable temperature when going home.

It should be noted that when the user uses the electronic device, the electronic device may generate the switching request by text, speech, or keystrokes. Taking the switching request being generated by speech as an example, the electronic device may convert the speech to text content, and then extract keywords from the text content, such as turn off, refrigerator. At this time, it may be obtained that the electric load to be controlled is the refrigerator, and the target state is the turn-off state. After that, the corresponding dual-control switch may be determined according to the refrigerator, and the switching request in a preset format may be generated according to the dual-control switch and the turning-off, so as to facilitate the use of the dual-control switch.

Other embodiments of the present disclosure are obvious for those skilled in the art after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are indicated by claims below.

It should be understood that the present disclosure is not limited to the precise structure that has been described above and shown in the drawings, and various modifications and changes may be made without departing from the scope thereof. The scope of the present disclosure is limited only by the appended claims.

What is claimed is:

1. A controllable switch, comprising: a wireless communication module and a switch component coupled to the wireless communication module; the wireless communication module is configured to send a control instruction to the switch component in response to receiving a switching request; the switch component is configured to switch from a first state to a second state after receiving the control instruction; wherein, the first state is a turning-on state and the second state is a turning-off state, or the first state is the turning-off state and the second state is the turning-on state;

wherein, when a power supply of the wireless communication module is an external power supply, the controllable switch further comprises a first power supply circuit configured to convert a voltage or a current obtained from a power grid at a first terminal of the controllable switch for supplying power to the wireless communication module when the switch component is in the turning-on state;

wherein the switch component comprises a first switch-component terminal and a second switch-component terminal; the first power supply circuit comprises a first terminal, a second terminal and a third terminal; the first terminal of the first power supply circuit is coupled to a first power wire of the power grid, the second terminal of the first power supply circuit is coupled to the first switch-component terminal of the switch component, and the third terminal of the first power supply circuit is coupled to the wireless communication module;

the switch component is in the turning-on state when the first switch-component terminal and the second switch-component terminal of the switch component are connected.

2. The controllable switch according to claim 1, wherein the switch component comprises at least one of a single-pole double-throw switch and a relay.

3. The controllable switch according to claim 1, wherein the power supply of the wireless communication module comprises a battery power supply.

4. The controllable switch according to claim 1, wherein, when the power supply is the external power supply, the controllable switch further comprises a second power supply circuit configured to switch a voltage or a current obtained from a power grid at a first controllable-switch terminal of the controllable switch for supplying power to the wireless communication module when the switch component in the turning-off state.

5. The controllable switch according to claim 4, wherein, the switch component comprises a first switch-component terminal and a third switch-component terminal; the second power supply circuit comprises a first terminal, a second terminal and a third terminal; the first terminal of the second power supply circuit is coupled to a first power wire of the power grid, the second terminal of the second power supply circuit is coupled to the third switch-component terminal of the switch component, and the third terminal of the second power supply circuit is coupled to the wireless communication module;

the switch component is in the turning-off state when the first switch-component terminal and the third switch-component terminal of the switch component are connected.

6. The controllable switch according to claim 1, wherein the wireless communication module comprises at least one of a Wi-Fi module, a ZigBee module and a Bluetooth module.

7. The controllable switch according to claim 1, wherein the switch component further comprises a button configured to switch the controllable switch from the first state to the second state or from the second state to the first state after being triggered to operate.

8. A dual-control switch, comprising two controllable switches, wherein,
a first terminal of a first controllable switch is coupled to a first power wire of a power grid;
a first terminal of a second controllable switch is coupled to a first terminal of an electric load to be controlled;
a second terminal of the first controllable switch is coupled to a second terminal of the second controllable switch;
a third terminal of the first controllable switch is coupled to a third terminal of the second controllable switch;
in response to receiving a control instruction, the first controllable switch or the second controllable switch is configured to switch from a first state to a second state, such that the first terminal of the first controllable switch is connected to or disconnected from the first terminal of the second controllable switch;
the control instruction comprises at least one of a control instruction received by a wireless communication module of the first controllable switch, a control instruction received by a wireless communication module of the second controllable switch, a button of the first controllable switch being triggered to operate, and a button of the second controllable switch being triggered to operate.

9. The dual-control switch according to claim 8, wherein, the wireless communication module of the first controllable switch and the wireless communication module of the second controllable switch are in a paired connection for determining an on-off state of the electric load, wherein the on-off state comprises a power-on state or a power-off state.

10. The dual-control switch according to claim 8, wherein, each controllable switch includes:
a wireless communication module, and
a switch component;
wherein:
the wireless communication module is coupled to the switch component,
the wireless communication module is configured to send the control instruction to the switch component in response to receiving a switching request,
the switch component is configured to switch from the first state to the second state after receiving the control instruction, the first state being a turning-on state and the second state being a turning-off state, or the first state being the turning-off state and the second state being the turning-on state.

11. The dual-control switch according to claim 10, wherein:
the switch component comprises at least one of a single-pole double-throw switch and a relay;
a power supply of the wireless communication module comprises at least one of a battery power supply and an external power supply; and
the wireless communication module comprises at least one of a Wi-Fi module, a ZigBee module and a Bluetooth module.

12. The dual-control switch according to claim 10, wherein,
when the power supply is the external power supply, the controllable switch further comprises a first power supply circuit; the first power supply circuit is configured to convert a voltage or a current obtained from a power grid at a first terminal of the controllable switch for supplying power to the wireless communication module when the switch component is in the turning-on state.

13. The dual-control switch according to claim 12, wherein,
wherein: the switch component comprises a first switch-component terminal and a second switch-component terminal; the first power supply circuit comprises a first terminal, a second terminal and a third terminal; the first terminal of the first power supply circuit is coupled to a first power wire of the power grid, the second terminal of the first power supply circuit is coupled to the first switch-component terminal of the switch component, and the third terminal of the first power supply circuit is coupled to the wireless communication module;
the switch component is in the turning-on state when the first terminal and the second terminal of the switch component are connected.

14. The dual-control switch according to claim 11, wherein,
when the power supply is the external power supply, the controllable switch further comprises a second power supply circuit; the second power supply circuit is configured to switch a voltage or a current obtained from a power grid at a first terminal of the controllable switch for supplying power to the wireless communication module when the switch component is in the turning-off state.

15. The dual-control switch according to claim 14, wherein, the switch component comprises a first switch-component terminal and a third switch-component terminal; the second power supply circuit comprises a first terminal, a second terminal and a third terminal; the first terminal of the second power supply circuit is coupled to a first power wire of the power grid, the second terminal of the second power supply circuit is coupled to the third switch-component terminal of the switch component, and the third terminal of the second power supply circuit is coupled to the wireless communication module;
the switch component is in the turning-off state when the first switch-component terminal and the third switch-component terminal of the switch component are connected.

16. A control system, comprising a dual-control switch and an electric load; a first terminal of a first controllable switch in the dual-control switch is coupled to a first power wire of a power grid; a first terminal of a second controllable switch in the dual-control switch is coupled to a first terminal of the electric load to be controlled; a second terminal of the first controllable switch is coupled to a second terminal of the second controllable switch; a third terminal of the first controllable switch is coupled to a third terminal of the second controllable switch; a second terminal of the electric load to be controlled is coupled to a second power wire of the power grid;
in response to receiving a control instruction, the first controllable switch or the second controllable switch is configured to switch from a first state to a second state such that the first terminal of the first controllable switch is connected to or disconnected from the first terminal of the second controllable switch;
the control instruction comprises at least one of a control instruction received by the first controllable switch, a control instruction received by the second controllable switch, a button of the first controllable switch being triggered to operate, and a button of the second controllable switch being triggered to operate.

17. The control system according to claim 16, further comprising a network device, the network device being paired with at least one of the first controllable switch and the second controllable switch, and configured to send a received switching request to the controllable switch that keeps paired with the network device.

18. The control system according to claim 17, further comprising a cloud server, the cloud server is configured to maintain a communication link with the network device, and configured to send a switching request received from an electronic device to the network device.

\* \* \* \* \*